No. 782,622. PATENTED FEB. 14, 1905.
R. QUAREZ.
APPARATUS FOR TREATING LIQUIDS WITH GASES.
APPLICATION FILED AUG. 24, 1904.
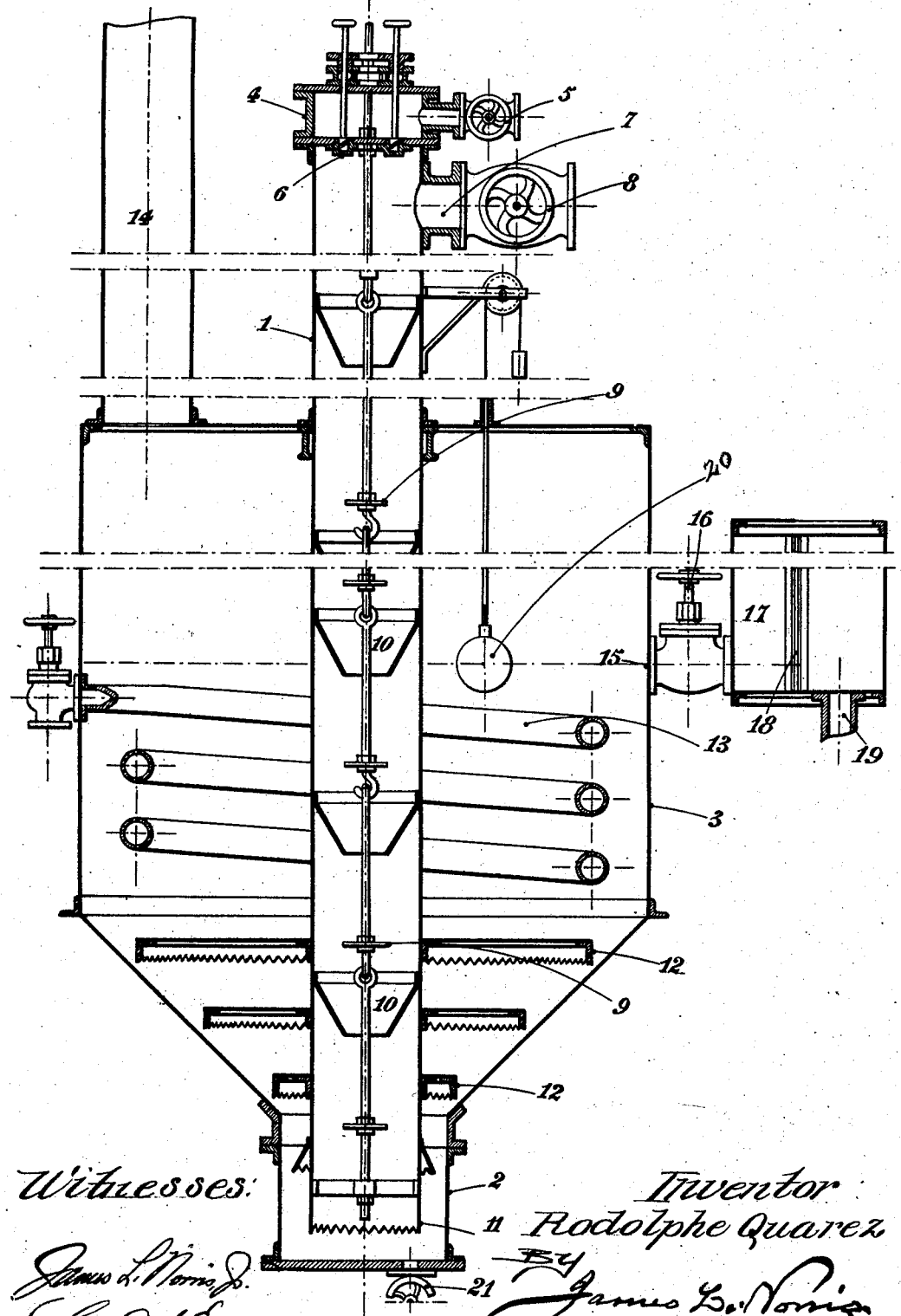

No. 782,622. Patented February 14, 1905.

UNITED STATES PATENT OFFICE.

RODOLPHE QUAREZ, OF AMIENS, FRANCE.

APPARATUS FOR TREATING LIQUIDS WITH GASES.

SPECIFICATION forming part of Letters Patent No. 782,622, dated February 14, 1905.

Application filed August 24, 1904. Serial No. 222,016.

*To all whom it may concern:*

Be it known that I, RODOLPHE QUAREZ, engineer, a citizen of the French Republic, residing at Amiens, Somme, France, have invented certain new and useful Improvements in Apparatus for Treating Liquids with Gases, of which the following is a specification.

This invention has for its object to provide an apparatus for treating liquids with gas either continuously or intermittently.

The hereinafter-described apparatus is more especially intended for the treatment of beet-root or cane-juice by carbonic-acid gas from lime-kilns, which operation is called "carbonatation" or "saturation." It may, however, be also adapted to the treatment of saccharine liquors by sulfurous acid (sulfitation) or to the treatment by air of the liquids to be subjected to fermentation, (aeration of worts,) and generally in all cases in which a gas has to be dissolved or absorbed more thoroughly and rapidly than with the apparatus hitherto in use.

By means of apparatus made according to this invention the liquid to be treated and the saturating-gas are compressed and forced under pressure in a downward direction into a tube or downflow-column, the internal arrangement of which causes the fluid therein to be divided and mixed intimately, so as to form a kind of emulsion. In order that the liquid may be acted on by the gas at a suitable pressure, the downflow-column is connected at its lower part with a second column, hereinafter called the "ascension-column," in which the liquid is maintained at a certain height, which determines the pressure in the downflow-column. Means are also provided in the ascension-column for further breaking up or dividing the fluids contained therein.

The accompanying drawing shows by way of example an apparatus constructed in accordance with this invention.

In the drawing, 1 is the flow-column, 2 the lower part of the ascension-column, and 3 the upper part of the apparatus or expansion-chamber. The liquid and saturating-gas for the downflow-column is supplied in any suitable manner, separately or together, but preferably the downflow-column is surrounded by a liquid-distributer 4. Under the pressure imparted to it by a pump or a reservoir (not shown) situated at a higher level the liquid passes through the valve 5, which regulates the supply thereof, and is projected into the downflow-column in the form of a fine shower or spray through the nozzles 6, each of these nozzles being provided with a conical plug having one or more helical grooves which allow the passage of a jet of liquid, to which a gyratory motion is imparted for the purpose of reducing it to a fine spray and retarding its fall. Each of the plugs can be raised from outside, so as to free the opening of the plug-seat in case one of the helical grooves should become obstructed by grit or other foreign matter. The finely-divided liquid meets as it enters the downflow-column the saturating-gas, supplied under pressure by a pump or a blower through the gas-inlet 7, which is controlled by the valve 8. The mixture of the fluids forms a succession of cascades as it falls on the disks 9, and by traversing the funnels 10 the said mixture is caused to alternately expand and contract, so that the mixture of the gas and liquid becomes more intimate and rapid, and complete physical and chemical reactions are promoted.

The columns of the apparatus, the disks, and funnels may be of any suitable shape in cross-sections, and the said disks may be fixed in any suitable manner, but preferably as shown, to a central rod.

The liquid must be maintained in the ascension-column at the height which corresponds to the pressure under which the gas is to react on the liquid to be saturated.

At the lower end of the downflow-column the mixture of liquid and incompletely-absorbed gas is divided by passing through a comb or combs or serrations or the like 11. The mixture further meets both in the narrow part of the ascension-column 2 and in the expansion-chamber 3 a series of deflectors 12 with serrated rims or perforations and of different diameters. The deflectors retard the motion and prolong the contact of the liquid with the gas.

The drawing shows an apparatus arranged for continuous working. The expansion-chamber contains a worm 13 for preheating the liquid by steam to the desired temperature. The gases that have not been absorbed and the vapors from the liquid escape into the atmosphere through the chimney 14.

The saturated liquid leaves the apparatus through the outlet 15, provided with a valve 16, and passes through a testing-tank 17. The said tank is divided into two compartments by a vertical partition 18, sliding in guides like a damper. The position of this partition is to be so determined by experiments that its height above the bottom of the tank is such that the liquid passing below it and falling afterward into the outlet-pipe 19 carries with it but little or no scum, the scum being held back by the partition, which thus acts as a screen, while the level which it occupies in the first compartment of the testing-tank and the level of a float 20 in the expansion-chamber inform the attendant of the working conditions of the apparatus and the regulations to be effected.

If the apparatus is intended only for intermittent operations, the testing-tank may be removed. In this case the operation should be so conducted that it is nearly at an end when the liquid reaches the level of a test-cock arranged at the same height as the outlet 15. The apparatus is then emptied through the valve 21, situated at the bottom of the apparatus.

When it is required to pass the liquid several times through the downflow-column, it is pumped back from the expansion-chamber and forced alone, or mixed with a small quantity of fresh liquid, into the downflow-column.

If required, several downflow-columns may be provided in one expansion-chamber and may be worked in parallel or in two series, one of which operates on fresh liquid, while the other operates on the partly-saturated liquid.

Having now particularly described and ascertained the nature of the said invention and in what manner the same is to be performed, I declare that what I claim is—

1. In an apparatus for saturating liquid with gases, embodying a downflow-column for the liquids and gases, means for supplying the liquids and gases to the said column, deflectors arranged within said column, and means forming contracted passages interposed between said deflectors within said column.

2. In an apparatus of the character described, a downflow-column, an ascension-column communicating at its lower end with said downflow-column, and superposed serrated deflectors arranged within said ascension-column.

3. In an apparatus of the character described, a downflow-column, an ascension-column communicating at its lower end with said downflow-column, and superposed serrated deflectors of varying diameters arranged within said ascension-column.

4. In an apparatus of the character described, a downflow-column, an ascension-column communicating with said downflow-column, and a plurality of superposed deflectors arranged within said ascension-column and having serrated rims.

5. In an apparatus of the character described, a downflow-column, an ascension-column communicating with said downflow-column, a plurality of superposed deflectors arranged within said ascension-column and of varying diameters, a test-tank communicating with said ascension-column and provided with an outlet, and a vertically-extending and adjustable partition arranged in said test-tank and forming a filtering medium for retaining the scum and allowing the liquid to flow through the outlet-pipe.

6. In an apparatus of the character described, a downflow-column, an ascension-column communicating with said downflow-column, a plurality of superposed deflectors arranged within said ascension-column and of varying diameters, a test-tank communicating with said ascension-column and provided with an outlet, an adjustable partition arranged in said test-tank and forming a filtering medium for retaining the scum and allowing the liquid to flow through the outlet-pipe, a plurality of deflectors arranged within said downflow-column, and a plurality of contracted sleeves forming passages interposed between said deflectors in said downflow-column.

7. In an apparatus for saturating liquids with gases, a downflow-column, means for supplying liquids and gases thereto, a plurality of deflectors arranged within said column, and a plurality of contracted sleeves arranged within said column and forming passages.

8. In an apparatus of the character described, a downflow-column having a serrated lower edge and further provided with contracted passages and deflectors, an ascension-column communicating with said downflow-column, a plurality of serrated deflectors arranged within said ascension-column, and a testing device communicating with said ascension-column and having an outlet.

In testimony whereof I have hereunto set my hand in presence of two subscribing witnesses.

RODOLPHE QUAREZ.

Witnesses:
E. MANGIS,
J. CARON.